(12) United States Patent
Shen et al.

(10) Patent No.: US 8,193,976 B2
(45) Date of Patent: Jun. 5, 2012

(54) POSITIONING SYSTEM, POSITIONING IC CHIP, POSITIONING METHOD AND POSITIONING PROGRAM FOR ESTIMATING A POSITION OF A RECEIVER

(75) Inventors: Jiyun Shen, Yokohama (JP); Yasuhiro Oda, Yokosuka (JP); Kosei Takiishi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 377 days.

(21) Appl. No.: 12/098,711

(22) Filed: Apr. 7, 2008

(65) Prior Publication Data

US 2008/0252528 A1    Oct. 16, 2008

(30) Foreign Application Priority Data

Apr. 13, 2007  (JP) ................... P2007-106224

(51) Int. Cl.
  *G01S 19/40* (2010.01)
  *G01S 19/20* (2010.01)
(52) U.S. Cl. ............... 342/357.23; 342/357.58
(58) Field of Classification Search ............. 342/357.23, 342/357.58
See application file for complete search history.

(56) References Cited

U.S. PATENT DOCUMENTS

| | | | | |
|---|---|---|---|---|
| 5,373,298 A * | 12/1994 | Karouby | ................. | 342/357.22 |
| 5,825,328 A * | 10/1998 | Schipper et al. | ......... | 342/357.29 |
| 6,084,544 A * | 7/2000 | Camp, Jr. | ................. | 342/357.28 |
| 6,166,684 A | 12/2000 | Yoshikawa et al. | | |
| 6,268,823 B1 * | 7/2001 | Nelson, Jr. | ............... | 342/357.23 |
| 6,417,800 B1 * | 7/2002 | Valio et al. | ............... | 342/357.25 |
| 7,436,355 B2 * | 10/2008 | Nicholson et al. | ....... | 342/357.58 |
| 7,696,922 B2 * | 4/2010 | Nicholson et al. | ....... | 342/357.58 |
| 2004/0203853 A1 * | 10/2004 | Sheynblat | ................. | 455/456.1 |
| 2006/0012514 A1 | 1/2006 | Gomm | | |

FOREIGN PATENT DOCUMENTS

JP     57-203317     6/1981

OTHER PUBLICATIONS

Kaplan, "Understanding GPS Principles and Applications," Dec. 2006, pp. 347-351.*

(Continued)

*Primary Examiner* — Gregory C Issing
(74) *Attorney, Agent, or Firm* — Oblon, Spivak, McClelland, Maier & Neustadt, L.L.P.

(57) ABSTRACT

The present invention easily evaluates the positioning accuracy by using fewer signal sources. The receiver is a positioning system for estimating the position of the receiver itself which is constituted by: a distance calculation section which calculates information indicating the respective distances between a plurality of GPS satellites and the receiver on the basis of signals which are transmitted by the plurality of GPS satellites and received by the receiver; a position calculation section which calculates the position of the receiver from information indicating the positions of the respective GPS satellites and information indicating the respective distances thus calculated; a distance difference calculation section which calculates, for each of the GPS satellites, the differences between the respective distances from the calculated position of the receiver to the respective GPS satellites, and the respective distances calculated by the distance calculation section; and a position accuracy evaluation section which evaluates an accuracy of the calculated position of the receiver on the basis of variation, between the GPS satellites, of the calculated differences, for each of the GPS satellites.

13 Claims, 11 Drawing Sheets

OTHER PUBLICATIONS

Bradford W. Parkinson, et al., "Global Positioning System: Theory and Applications vol. II", American Institute of Aeronautics and Astronautics, Inc., Chapter 5, 1996, 1 front page, pp. 143-165.

Elliott D. Kaplan, et al., "Understanding GPS Principles and Applications, Second Edition", Artech House, Dec. 31, 2006, pp. 52-54 and pp. 347-351.

Extended European Search Report issued Dec. 2, 2010, in European Patent Application No. 08007241.6.

Office Action issued Aug. 30, 2011, in Japanese Patent Application No. 2007-106224 (with English-language translation).

Bradford W. Parkinson, et al., "Autonomous GPS Integrity Monitoring Using the Pseudorange Residual", Navigation: Journal of the Institute of Navigation, vol. 35, No. 2, 1988, pp. 49-65.

Office Action issued Oct. 6, 2011 in Europe Application No. 08 007 241.6.

* cited by examiner

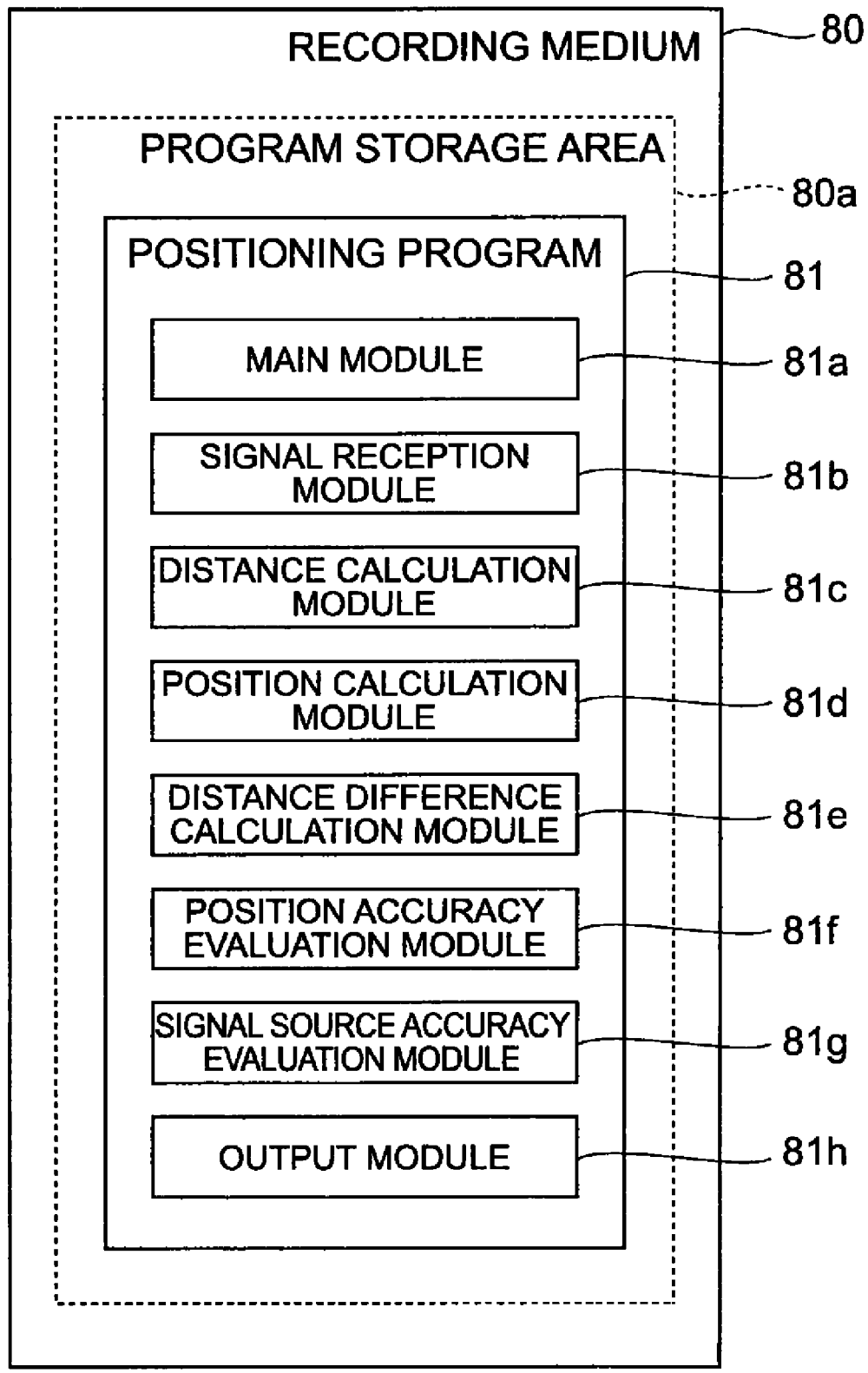

POSITIONING SYSTEM, POSITIONING IC CHIP, POSITIONING METHOD AND POSITIONING PROGRAM FOR ESTIMATING A POSITION OF A RECEIVER

BACKGROUND OF THE INVENTION

1. Field of the Invention

The present invention relates to a positioning system, a positioning IC chip, a positioning method, and a positioning program for estimating the position of a receiver.

2. Description of the Related Art

Conventionally, a technology which performs positioning of a receiver by using the distances from satellites (including pseudo-satellites) which are positioning signal sources to the receiver such as GPS (Global Positioning System) and Galileo and so forth are known. There are also positioning systems known as hybrids which perform positioning by combining the usage of a signal from the satellite and a signal of the mobile communication network.

With the above positioning method, a positioning calculation is performed by calculating the distances from the satellites to the receiver on the basis of the transmission times and reception times of the positioning signals transmitted by the satellites and received by the receiver and using the distances thus calculated. If the distances from a plurality of satellites to the receiver are determined exactly, the position of the receiver can be calculated by finding the intersection between spheres at whose center the satellites are located and whose radii are the determined distances. However, it is difficult to calculate the exact distances because a variety of elements capable of producing an error exist in the distance calculation.

Therefore, the position of the receiver is calculated using a method such as the least-square method from the calculated distances between the plurality of satellites and the receiver. Here, because the error in the calculated distance between the satellite and the receiver differs for each satellite, there is sometimes a difference between the calculated position of the receiver and the actual position of the receiver as mentioned earlier. That is, a positioning error normally occurs with the above method.

Such a positioning error is evaluated, that is, the positioning accuracy is evaluated. The evaluated positioning accuracy is used in the judgment to provide the user with positioning information in cases where the positioning accuracy is high, for example. Positioning accuracy evaluation methods conventionally include the method known as RAIM (Receiver Autonomous Integrity Monitoring). With RAIM, the combination of satellites used for the positioning is changed and an evaluation of the positioning accuracy is made on the basis of changes in the positioning results between these combinations of satellites. Details of the above appear in B W Parkinson, J J Spilker, "Global Positioning System: Theory and Applications Volume II-Chapter 5", American Institute of Aeronautics and Astronautics, Inc., pages 143 to 164, 1996 (Non-Patent Document 1).

However, because a minimum of five positioning satellites are required with RAIM, there has been the problem that the receiver needs to capture a large number of satellites. In addition, with RAIM, the positioning calculation using the combination of satellites must be repeated five times or more.

SUMMARY OF THE INVENTION

The present invention was conceived in view of the above problems, an object of the present invention is to provide a positioning system, a positioning IC chip, a positioning method, and a positioning program capable of evaluating the positioning accuracy easily by using fewer signal sources.

In order to achieve the above object, a positioning system according to the present invention is a positioning system for estimating a position of a receiver, comprising: distance information acquisition means for acquiring information indicating respective distances, between a plurality of signal sources and the receiver, which are calculated on the basis of signals transmitted by the plurality of signal sources and received by the receiver; position calculation means for calculating the position of the receiver from information indicating the positions of the plurality of signal sources and information indicating the respective distances acquired by the distance information acquisition means; distance difference calculation means for calculating, for each of the plurality of signal sources, differences between the respective distances from the position of the receiver calculated by the position calculation means to the plurality of signal sources, and the respective distances according to the information acquired by the distance information acquisition means; and position accuracy evaluation means for evaluating an accuracy of the position of the receiver calculated by the position calculation means on the basis of variation, between the plurality of the signal sources, of the difference calculated by the distance difference calculation means, for each of the plurality of signal sources.

The positioning system according to the present invention calculates the position of the receiver on the basis of the distances between a plurality of signal sources and the receiver which are calculated on the basis of the signals transmitted by the respective signal sources and received by the receiver. Thereafter, the difference between the distances from the calculated position of the receiver to the signal sources and the distances between the respective signal sources and the receiver based on the signals is calculated and the accuracy of the position calculated for the receiver is evaluated on the basis of the variation of this difference.

Hence, with the positioning system according to the present invention, the accuracy of the position thus calculated can be evaluated as long as the position of the receiver can be calculated. That is, with the positioning system according to the present invention, if the signal sources required for the calculation of the receiver position can be captured, the positioning accuracy can be evaluated. Namely, the positioning accuracy can be evaluated by using fewer signal sources. Furthermore, with the positioning system according to the present invention, there is no need to repeat the positioning calculation using a combination of signal sources and, therefore, the positioning accuracy can be easily evaluated.

The positioning calculation means desirably calculates, from the information representing the positions of the plurality of signal sources according to a plurality of times and information representing the respective distances acquired by the distance information acquisition means, the position of the receiver at each of the times; the distance difference calculation means desirably calculates the difference at each of the times; and the position accuracy evaluation means desirably evaluates the accuracy of the position of the receiver calculated by the position calculation means at each of the times. With this constitution, even in cases where, for whatever reason, there is an error with the information indicating the positions of the signal sources according to time which is used in the positioning calculation, because the accuracy with which the position of the receiver at a plurality of times is calculated is evaluated, exact positioning can therefore be performed.

The distance information acquisition means desirably acquires a plurality of information representing the respective distances, for each of the signal sources; the position calculation means desirably calculates a plurality of positions of the receiver in accordance with the information indicating a plurality of the respective distances acquired by the distance information acquisition means; the distance difference calculation means desirably calculates a plurality of the differences, for each of the plurality of positions of the receiver, calculated by the position calculation means; and the position accuracy evaluation means desirably evaluates the accuracy of the positions of the receiver on the basis of variation of the plurality of differences. With this constitution, the positioning accuracy when calculating positioning upon receipt of a plurality of signals is evaluated. As a result, even in cases where sufficient accuracy is not obtained with a single instance of receiving positioning signals such as when the receiver is indoors or the like, exact positioning can be carried out as a result of receiving of a plurality of signals.

The position accuracy evaluation means desirably detects transmission times at which signals are transmitted by the plurality of signal sources and reception times at which signals are received by the receiver on the basis of the accuracy of a plurality of positions of the receiver which are evaluated at each of the plurality of times for each information indicating the plurality of respective distances with respect to the plurality of positions of the receiver, calculated by the position calculation means in accordance with the information which indicates a plurality of the respective distances acquired by the distance information acquisition means, and desirably evaluates the accuracy of the positions of the receiver on the basis of variation of the differences between the transmission times and the reception times. With this constitution, more exact positioning can be carried out.

The distance information acquisition means desirably acquires a plurality of information which indicate the respective distances, for each of the signal sources; the position calculation means desirably calculates a plurality of positions of the receiver in accordance with the plurality of information which indicate the respective distances, the information being acquired by the distance information acquisition means; the distance difference calculation means desirably calculates the differences, for each of a plurality of positions of the receiver, which are calculated by the position calculation means; and the position accuracy evaluation means desirably evaluates the accuracy of the positions of the receiver on the basis of variation of the plurality of positions of the receiver calculated by the position calculation means. With this constitution, the positioning accuracy when performing positioning upon receipt of a plurality of signals is evaluated. As a result, even in cases where sufficient accuracy is not obtained with a single instance of receiving positioning signals such as when the receiver is indoors or the like, exact positioning can be carried out as a result of receiving of a plurality of signals.

In order to achieve the above object, a positioning system according to the present invention is a positioning system for estimating a position of a receiver, comprising distance information acquisition means for acquiring information indicating respective distances, between a plurality of signal sources and the receiver, which are calculated on the basis of signals transmitted by the plurality of signal sources and received by the receiver; position calculation means for calculating the position of the receiver from information indicating the positions of the plurality of signal sources and information indicating the respective distances acquired by the distance information acquisition means; distance difference calculation means for calculating, for each of the plurality of signal sources, differences between the respective distances from the position of the receiver calculated by the position calculation means to the plurality of signal sources, and the respective distances according to the information acquired by the distance information acquisition means; and signal source accuracy evaluation means for evaluating an accuracy of the plurality of signal sources when the position of the receiver is calculated by the position calculation means on the basis of variation, between the respective signal sources, of the differences calculated by the distance difference calculation means, for each of the plurality of signal sources.

The positioning system according to the present invention calculates the position of the receiver on the basis of the distances between a plurality of signal sources and the receiver which are calculated on the basis of the signals transmitted by the respective signal sources and received by the receiver. Thereafter, the difference between the distances from the calculated position of the receiver to the signal sources and the distances between the respective signal sources and the receiver based on the signals is calculated and the accuracy of the respective signal sources when calculating the position of the receiver is evaluated on the basis of variation of this difference.

Hence, with the positioning system according to the present invention, the accuracy of the position thus calculated can be evaluated as long as the position of the receiver can be calculated. That is, with the positioning system according to the present invention, if the signal sources required for the calculation of the receiver position can be captured, the positioning accuracy can be evaluated. Namely, the positioning accuracy can be evaluated by using fewer signal sources. Furthermore, with the positioning system according to the present invention, there is no need to repeat the positioning calculation using a combination of signal sources and, therefore, the positioning accuracy can be easily evaluated.

Further, in addition to it being possible to describe the present invention as the invention of the positioning system as above, the present invention can be described as the inventions of the positioning IC chip, positioning method, and positioning program as mentioned hereinbelow. This is merely a difference of category and is essentially the same invention which exhibits the same action and effects.

In other words, a positioning IC chip according to the present invention is a positioning IC chip for estimating a position of a receiver, comprising distance information acquisition means for acquiring information indicating respective distances, between a plurality of signal sources and the receiver, which are calculated on the basis of signals transmitted by the plurality of signal sources and received by the receiver; position calculation means for calculating the position of the receiver from information indicating the positions of the plurality of signal sources and information indicating the respective distances acquired by the distance information acquisition means; distance difference calculation means for calculating, for each of the plurality of signal sources, the differences between the respective distances from the position of the receiver calculated by the position calculation means to the plurality of signal sources, and the respective distances according to the information acquired by the distance information acquisition means; and position accuracy evaluation means for evaluating an accuracy of the position of the receiver calculated by the position calculation means on the basis of variation, between the plurality of the signal sources, of the differences calculated by the distance difference calculation means, for each of the plurality of signal sources.

Furthermore, a positioning IC chip according to the present invention is a positioning IC chip for estimating a position of a receiver, comprising distance information acquisition means for acquiring information indicating the respective distances, between a plurality of signal sources and the receiver, which are calculated on the basis of signals transmitted by the plurality of signal sources and received by the receiver; position calculation means for calculating the position of the receiver from information indicating the positions of the plurality of signal sources and information indicating the respective distances acquired by the distance information acquisition means; distance difference calculation means for calculating, for each of the plurality of signal sources, the differences between the respective distances from the position of the receiver calculated by the position calculation means to the plurality of signal sources, and the respective distances according to the information acquired by the distance information acquisition means; and signal source accuracy evaluation means for evaluating an accuracy of the plurality of signal sources when the position of the receiver is calculated by the position calculation means on the basis of variation, between the respective signal sources, of the differences calculated by the distance difference calculation means, for each of the plurality of signal sources.

Furthermore, a positioning method according to the present invention is a positioning method for estimating a position of a receiver, comprising a distance information acquiring step of acquiring information indicating respective distances, between a plurality of signal sources and the receiver, which are calculated on the basis of signals transmitted by the plurality of signal sources and received by the receiver; a position calculation step of calculating the position of the receiver from information indicating the positions of the plurality of signal sources and information indicating the respective distances acquired in the distance information acquisition step; a distance difference calculation step of calculating, for each of the plurality of signal sources, the differences between the respective distances from the position of the receiver calculated in the position calculation step to the plurality of signal sources, and the respective distances according to the information acquired in the distance information acquisition step; and a position accuracy evaluation step of evaluating an accuracy of the position of the receiver calculated in the position calculation step on the basis of variation, between the plurality of the signal sources, of the differences calculated in the distance difference calculation step, for each of the plurality of signal sources.

Furthermore, a positioning method according to the present invention is a positioning method for estimating a position of a receiver, comprising a distance information acquiring step of acquiring information indicating the respective distances, between a plurality of signal sources and the receiver, which are calculated on the basis of signals transmitted by the plurality of signal sources and received by the receiver; a position calculation step of calculating the position of the receiver from information indicating the positions of the plurality of signal sources and information indicating the respective distances acquired in the distance information acquisition step; a distance difference calculation step of calculating, for each of the plurality of signal sources, the differences between the respective distances from the position of the receiver calculated in the position calculation step to the plurality of signal sources, and the respective distances according to the information acquired in the distance information acquisition step; and a signal source accuracy evaluation step of evaluating an accuracy of the plurality of signal sources when the position of the receiver is calculated in the position calculation step on the basis of variation, between the respective signal sources, of the differences calculated in the distance difference calculation step, for each of the plurality of signal sources.

Furthermore, a positioning program according to the present invention is a positioning program that allows a computer to estimate a position of a receiver, the program causing the computer to execute: a distance information acquisition function for acquiring information indicating the respective distances, between a plurality of signal sources and the receiver, which are calculated on the basis of signals transmitted by the plurality of signal sources and received by the receiver; a position calculation function for calculating the position of the receiver from information indicating the positions of the plurality of signal sources and information indicating the respective distances acquired by the distance information acquisition function; a distance difference calculation function for calculating, for each of the plurality of signal sources, the differences between the respective distances from the position of the receiver calculated by the position calculation function to the plurality of signal sources, and the respective distances according to the information acquired by the distance information acquisition function; and a position accuracy evaluation function for evaluating an accuracy of the position of the receiver calculated by the position calculation function on the basis of variation, between the plurality of the signal sources, of the differences calculated by the distance difference calculation function, for each of the plurality of signal sources.

In addition, a positioning program according to the present invention is a positioning program that allows a computer to estimate a position of a receiver, the program causing the computer to execute: a distance information acquisition function for acquiring information indicating the respective distances, between a plurality of signal sources and the receiver, which are calculated on the basis of signals transmitted by the plurality of signal sources and received by the receiver; a position calculation function for calculating the position of the receiver from information indicating the positions of the plurality of signal sources and information indicating the respective distances acquired by the distance information acquisition function; a distance difference calculation function for calculating, for each of the plurality of signal sources, the differences between the respective distances from the position of the receiver calculated by the position calculation function to the plurality of signal sources, and the respective distances according to the information acquired by the distance information acquisition function; and a signal source accuracy evaluation function for evaluating an accuracy of the plurality of signal sources when the position of the receiver is calculated by the position calculation means on the basis of variation, between the respective signal sources, of the differences calculated by the distance difference calculation means, for each of the plurality of signal sources.

According to the present invention, as long as the position of the receiver can be calculated, it is possible to evaluate the accuracy of the calculated position of the receiver or the respective signal sources used in the calculation. In other words, according to the present invention, if the signal sources required for the calculation of the receiver position can be captured, the positioning accuracy can be evaluated. Namely the positioning accuracy can be evaluated by using fewer signal sources. Further, with the positioning system according to the present invention, because there is no need to repeat the positioning calculation using a combination of signal sources, the positioning accuracy can be easily evaluated.

BRIEF DESCRIPTION OF THE DRAWINGS

FIG. 11 shows the constitution of the positioning program according to the present invention.

DESCRIPTION OF THE PREFERRED EMBODIMENTS

Preferred embodiments of the positioning system, positioning IC chip, and positioning method according to the present invention will be described in detail hereinbelow in conjunction with the drawings. The same symbols are assigned to the same numerals in the description of the drawings and repetitive descriptions are omitted.

Figure 1:
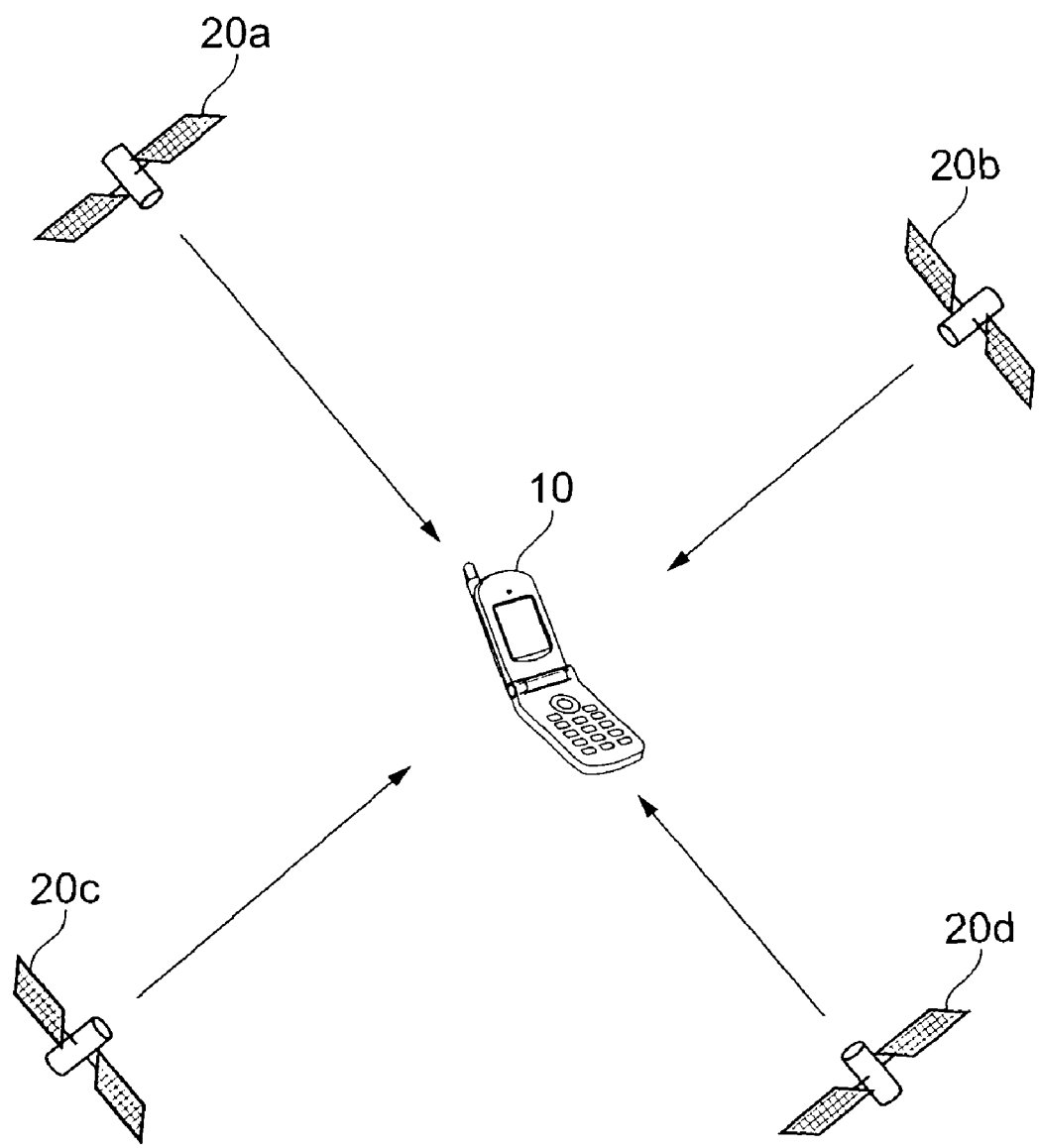
FIG. 1 shows a receiver which is a positioning system according to an embodiment of the present invention and GPS satellites which are used in the positioning.

FIG. 1 shows a receiver 10 which is the positioning system according to this embodiment and a plurality of GPS satellites 20 which are the signal sources used in the positioning (which is a general term for the GPS satellites 20a to 20d). Receiver 10 is a positioning device which estimates its own position. The positioning by the receiver 10 is executed by using positioning signals consisting of radio waves which are transmitted by the GPS satellites 20. In addition to a function for performing positioning, receiver 10 may also have a function for performing mobile communications. The receiver 10 is specifically a mobile communication terminal such as a cellular phone which is carried by the user, for example. The positioning carried out by the receiver 10 is performed in cases such as a case where the user makes an input to start up the positioning function to the receiver 10 when the user knows their own position.

The GPS satellites 20 are located at predetermined points depending on the time and transmit positioning signals which are used in the positioning from these positions. In specific terms, four to five GPS satellites 20 are located in six high orbits at an altitude of approximately 20000 kilometers and move through the orbits as time elapses. The positioning signals which are transmitted by the GPS satellites 20 contain identification information for distinguishing and specifying the GPS satellites 20, information indicating the orbits of the GPS satellite 20, and information indicating the times at which the signals were transmitted.

The principles behind the positioning and the errors in the positioning which occur as a result of the positioning of this embodiment will now be described in simple terms by using FIGS. 2 to 4. Receiver 10 receives the positioning signals from the GPS satellites 20 and calculates the information indicating the distance between the GPS satellites 20 and the receiver 10 on the basis of the received signal. The calculation of the distance is performed on the distance between the GPS satellites 20a to 20d and the receiver 10 upon receipt of the radio waves from the GPS satellites 20a to 20d. More specifically, the calculation of the distance is carried out by multiplying the time from the moment the signals are transmitted by the GPS satellites 20a to 20d until the signals are received by the receiver 10 by the speed of light. That is, the distances a to d between the GPS satellites 20a to 20d and the receiver 10 are calculated by means of the following equation by using the transmission time $t_t$ of the signals from the GPS satellites 20a to 20d, the reception times $t_{ra}$ to $t_{rd}$ of the respective signals by the receiver 10, and the speed of light.

$$\text{distance } a = \text{speed of light} \times (t_{ra} - t_t)$$

...

$$\text{distance } d = \text{speed of light} \times (t_{rd} - t_t)$$

Figure 2:
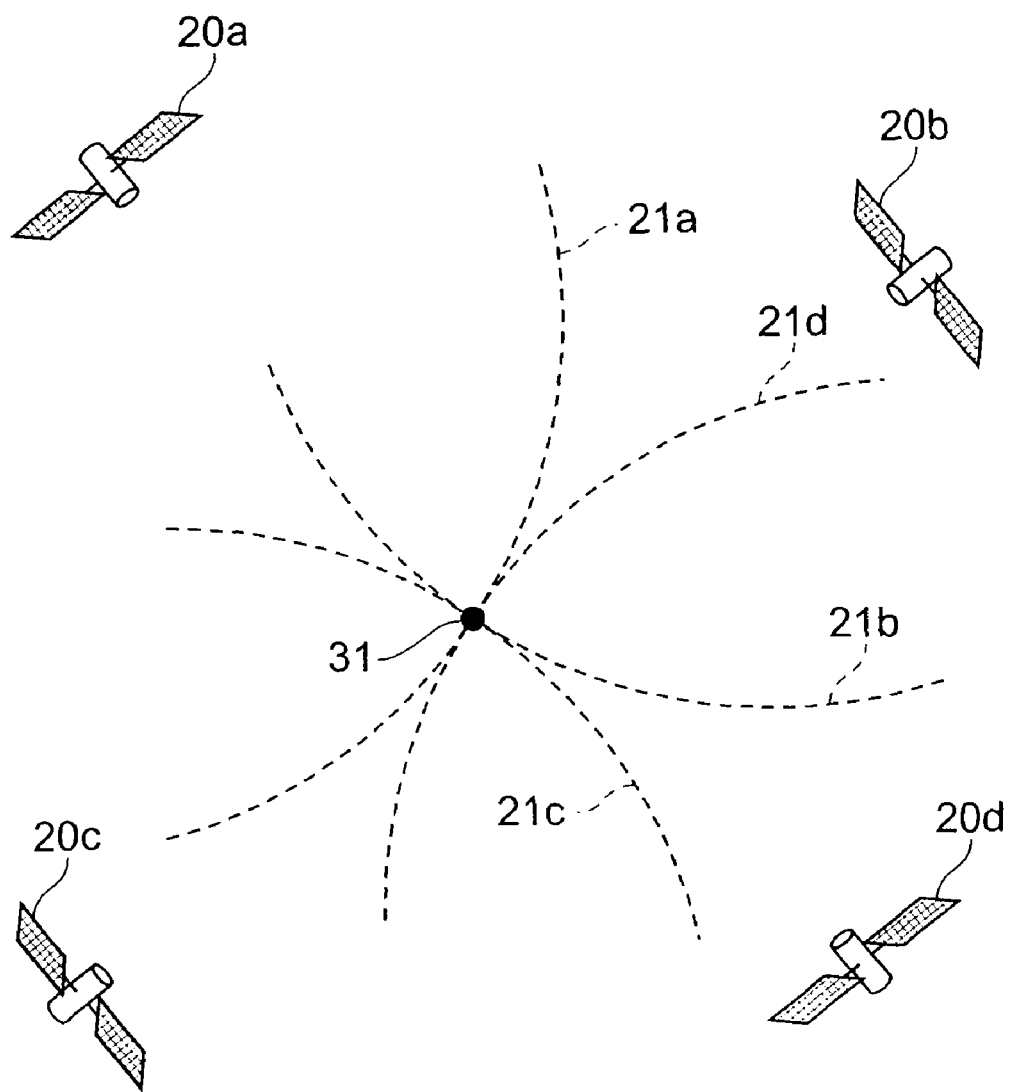
FIG. 2 shows the principles of positioning according to this embodiment.
Figure 3:
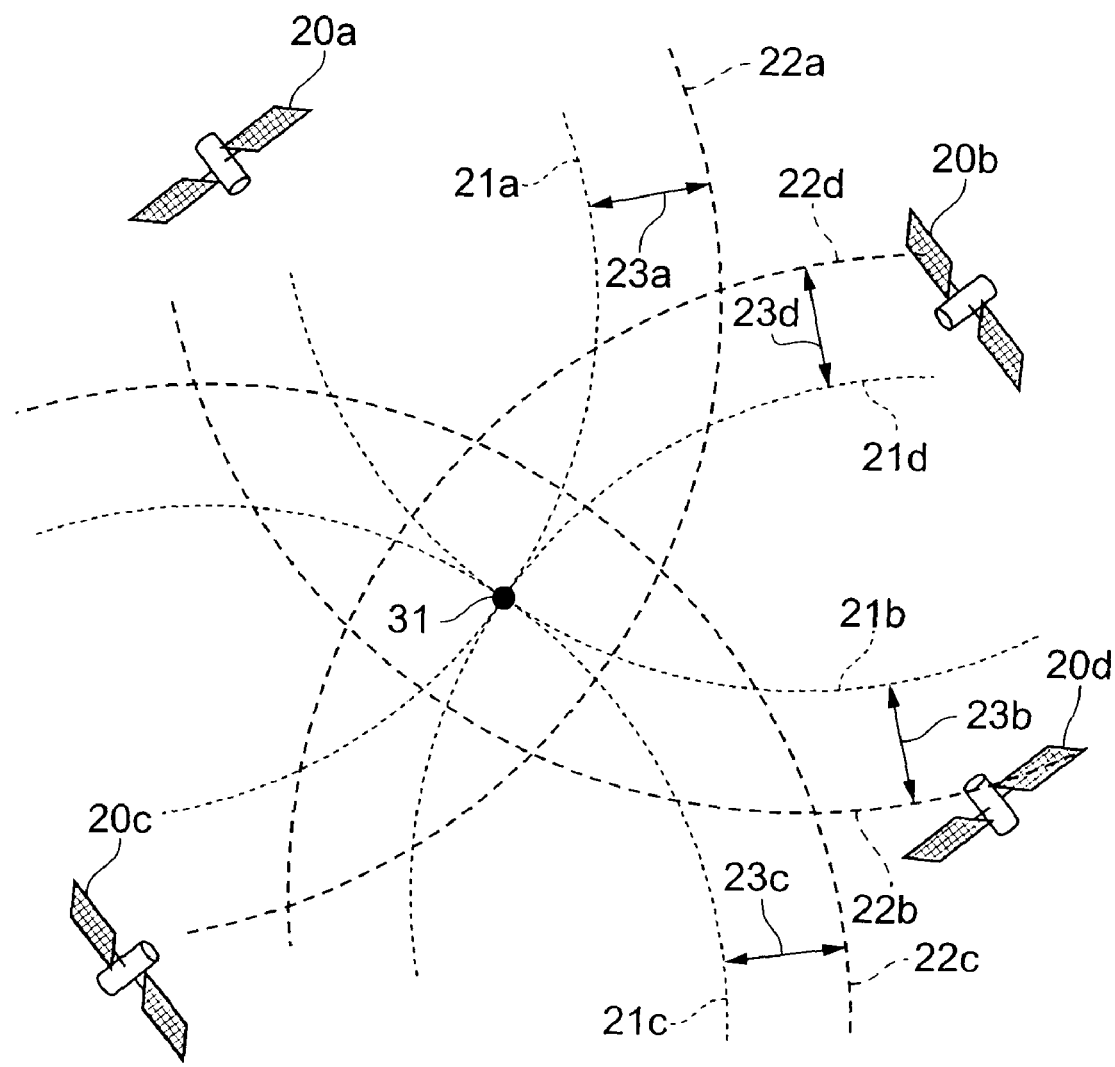
FIG. 3 shows the principles of positioning according to this embodiment.

If the distances between the GPS satellites 20a to 20d and the receiver 10 are calculated exactly, the intersection 30 between the spheres (circles) 21a to 21d at whose center are located the respective GPS satellites 20a to 20d and whose radii are the calculated distances constitutes the position of receiver 10, as shown in FIG. 2.

However, the calculated distances between the GPS satellites 20a to 20d and the receiver 10 normally contain errors. The cause of the error is the shift in the clocks between the respective GPS satellites 20a to 20d and the receiver 10, multipaths, errors with the orbit information of the respective GPS satellites 20a to 20d and changes in the atmosphere, and so forth. Hence, as shown in FIG. 3, the spheres (circles) 22a to 22d at whose center are located the respective GPS satellites 20a to 20d and whose radii are the calculated distances and the spheres (circles) 21a to 21d whose radii are the exact distances (actual distances) are displaced. Here, in cases where the sizes of the shifts 23a to 23d between the exact distances and calculated distances coincide between the respective GPS satellites 20a to 20d, the exact position of the receiver 10 can be calculated as the position 31 of equal distances from the spheres (circles) 22a to 22d whose radii are the calculated distances by means of the least-square method. In this case, it is necessary to utilize a minimum of four GPS satellites 20 in the calculation of the position of receiver 10.

Figure 4:
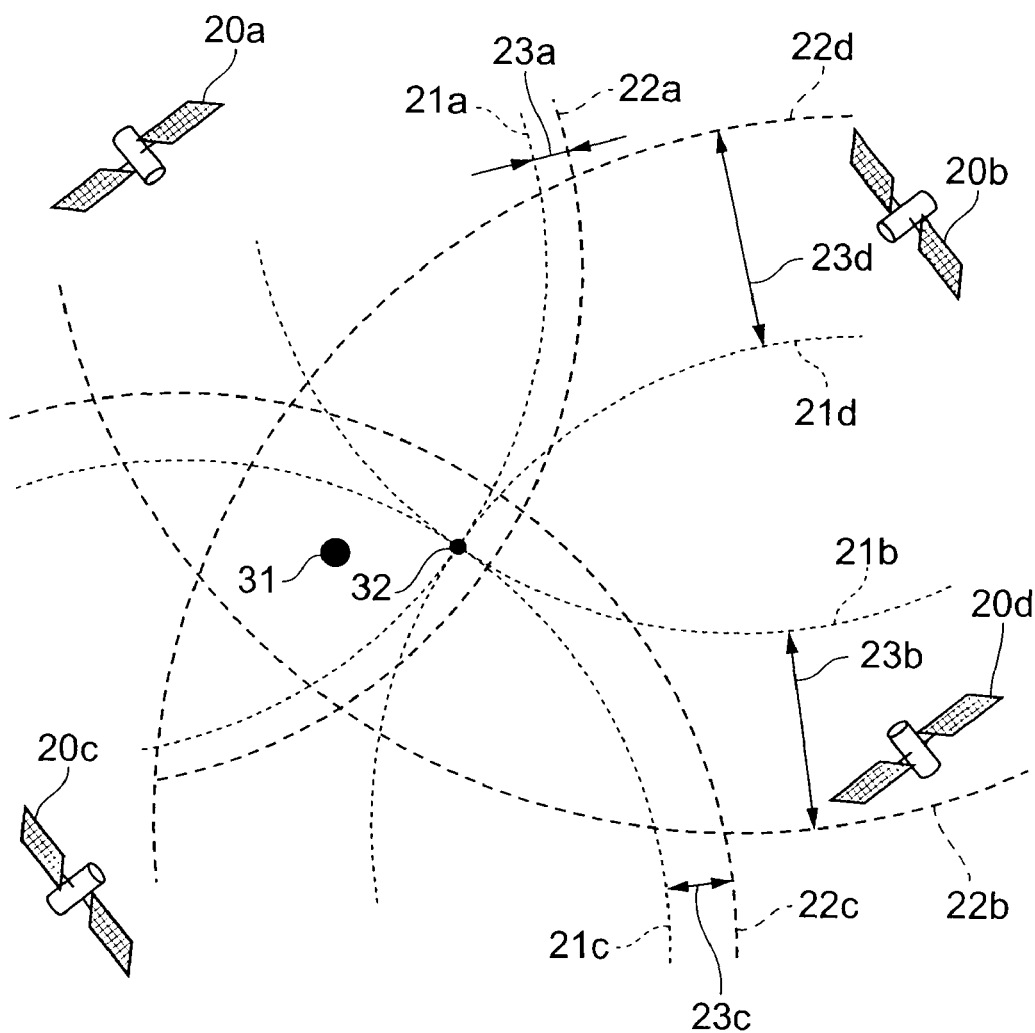
FIG. 4 shows the principles of positioning according to this embodiment.
Figure 5:
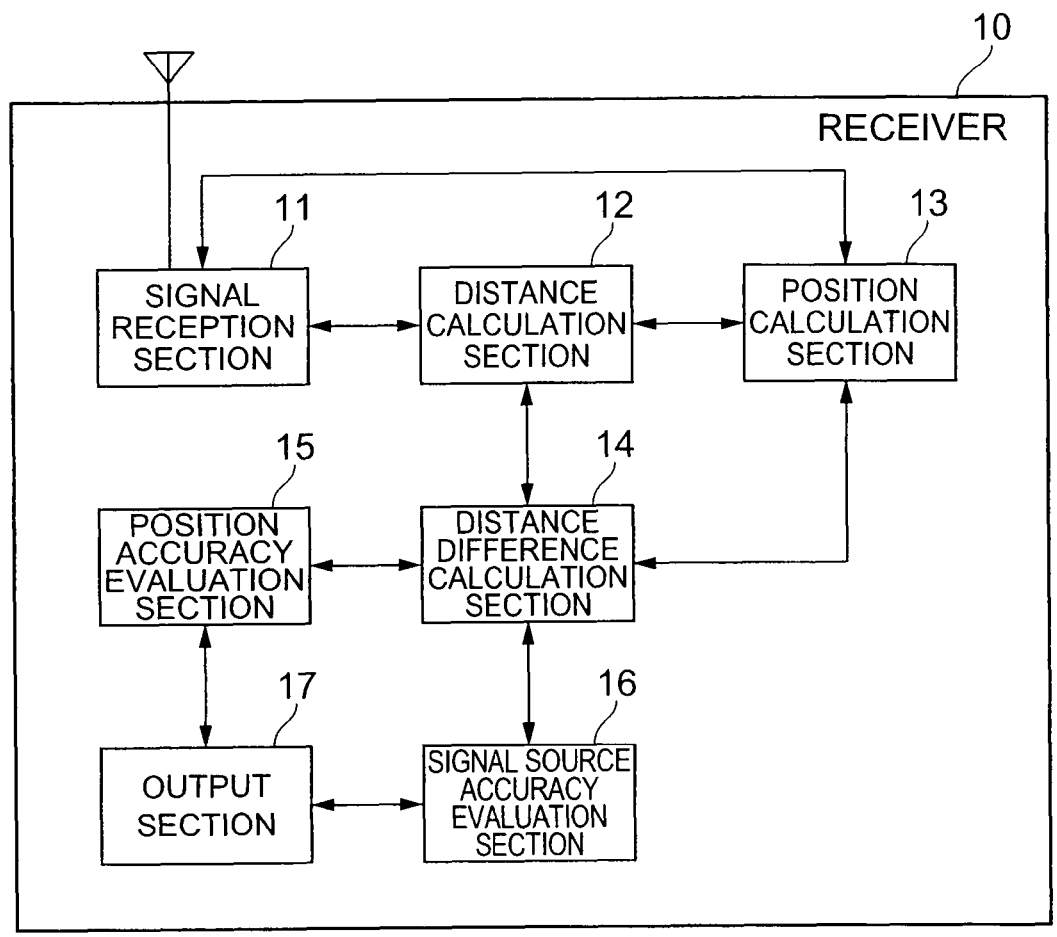
FIG. 5 shows the functional constitution of the receiver which is the positioning system according to the embodiment of the present invention.

However, as shown in FIG. 4, the sizes of the shifts 23a to 23d between the exact distances and the calculated distances do not normally coincide between the respective GPS satellites 20a to 20d and vary widely. In this case, position 31 of the equal distances from the spheres (circles) 22a to 22d whose radii are the calculated distances, which is determined by means of the least-square method, is shifted with respect to the actual position 32 of the receiver 10.

Thus, the error between the calculated position and the actual position, that is, the positioning error is produced by variation of the shifts 23a to 23d between the exact distances and the calculated distances between the GPS satellites 20a to 20d and receiver 10.

Here, calculated distance $pr_n$ between the GPS satellites 20a to 20d and the receiver 10 (where n represents a subscript which corresponds with the GPS satellites 20a to 20d) can be expressed as follows:

Equation 1

$$\begin{cases} pr_1 = r_1 + clk_1 + \beta_1 + \varepsilon_1 \\ pr_2 = r_2 + clk_2 + \beta_2 + \varepsilon_2 \\ pr_3 = r_3 + clk_3 + \beta_3 + \varepsilon_3 \\ pr_4 = r_4 + clk_4 + \beta_4 + \varepsilon_4 \end{cases} \quad (1)$$

Here, $r_n$ is the actual distance from the GPS satellites 20a to 20d to the receiver 10; $clk_n$ is the distance of the shift between the clocks of the GPS satellites 20a to 20d and the clock of the receiver 10; $\beta_n$ is the distance error which is the cause of clock shifts between satellites and orbit information errors and changes in the atmosphere and so forth, where $\beta_n$ is a component that can be corrected. $\varepsilon_n$ is a distance error that arises from another multipath or an error that remains after $\beta_n$ correction, where $\varepsilon_n$ is a component that cannot be corrected.

Among the error elements contained in calculated distance $pr_n$, $clk_n$ takes the same value clk between the respective GPS satellites 20a to 20d because the clocks of the respective GPS satellites 20a to 20d are in sync with one another. In other words, $clk_n$ is said to be the clock bias of the receiver 10. In addition, as mentioned earlier, among the error elements contained in the calculated distance $pr_n$, $\beta_n$ can be corrected using the parameters of the navigation messages of the GPS satellites 20. However, among the error elements contained in the calculated distance $pr_n$, $\varepsilon_n$ contains a component which changes as a result of the atmosphere and an error which remains after $\beta_n$ correction and therefore takes different values for each of the GPS satellites 20a to 20d. $\varepsilon_n$ cannot be solved through calculation and cannot actually be observed or corrected. That is, the cause of the above-mentioned positioning error is $\varepsilon_n$. The principles of positioning of this embodiment and positioning errors which arise as a result of the positioning were described hereinabove. In the description below, the calculated distance $pr_n$ is considered to be the distance after $\beta_n$ correction has been carried out.

Subsequently, the functional constitution of the receiver 10 which is the positioning target and the subject of the positioning will be described. The receiver 10 is constituted by a signal reception section 11, a distance calculation section 12, a position calculation section 13, a distance difference calculation section 14, a position accuracy evaluation section 15, a signal source accuracy evaluation section 16, and an output section 17. Furthermore, the receiver 10 may also comprise a function for performing mobile communications.

The signal reception section 11 constitutes means for receiving positioning signals that are transmitted by the GPS satellites 20. The signal reception section 11 outputs the information contained in the received signals to the distance calculation section 12 and the position calculation section 13. In addition, the signal reception section 11 has a clock function and, by combining usage of the clock function with the above information, outputs the information representing the reception times at which the signals were received to the distance calculation section 12. The signal reception section 11 receives the signals of the plurality of GPS satellites 20.

The distance calculation section 12 constitutes means for calculating the distances between the respective GPS satellites 20 and the receiver 10 on the basis of the information input by the signal reception section 11. In other words, the distance calculation section 12 constitutes distance information acquisition means for acquiring information representing the respective distances between the plurality of GPS satellites 20 and the receiver 10 on the basis of the positioning signals which are transmitted by the plurality of GPS satellites 20 and received by the receiver 10. As mentioned specifically hereinabove, the distance calculation section 12 determines the time differences from the information representing the signal transmission times and the information indicating the signal reception times which are contained in the information that was input by the signal reception section 11, and calculates the distances by multiplying the time difference by the speed of light. The calculation of the distances is carried out for each GPS satellite 20 on the basis of the identification information of the GPS satellite 20. The distance calculation section 12 performs the above calculation on the basis of an algorithm for calculating the distances which is prepared beforehand. In addition, the method of calculating the distances is not necessarily limited to the above method and may include any method including existing methods as long as the calculation is performed on the basis of positioning signals. The distance calculation section 12 outputs information representing the respective distances acquired through calculation to the position calculation section 13 and distance difference calculation section 14.

The position calculation section 13 constitutes position calculation means for calculating the position of the receiver 10 from information indicating the positions of the plurality of GPS satellites 20 and information indicating the respective distances acquired by the distance calculation section 12. Here, the position calculation section 13 specifies the positions of the GPS satellites 20 from the information indicating the orbits of the GPS satellites 20, the information indicating the transmission times which are transmitted by the GPS satellites 20 and input via the signal reception section 11, and so on, and uses the positions in the calculation of the position of receiver 10.

The position calculation section 13 specifically stores an algorithm for calculating positions such as the least-square method as mentioned earlier, for example and calculates the position of the receiver 10 on the basis of the algorithm. The position calculation section 13 specifically calculates information indicating the positions of the GPS satellites 20 and the position of the receiver 10 as coordinates which indicate the latitude and longitude (also the altitude of the GPS satellites 20), for example. The position calculation section 13 outputs the information indicating the calculated position of the receiver 10 to the distance difference calculation section 14. The position calculation section 13 outputs the information indicating the calculated positions of the GPS satellites 20 to the distance difference calculation section 14.

Figure 6:
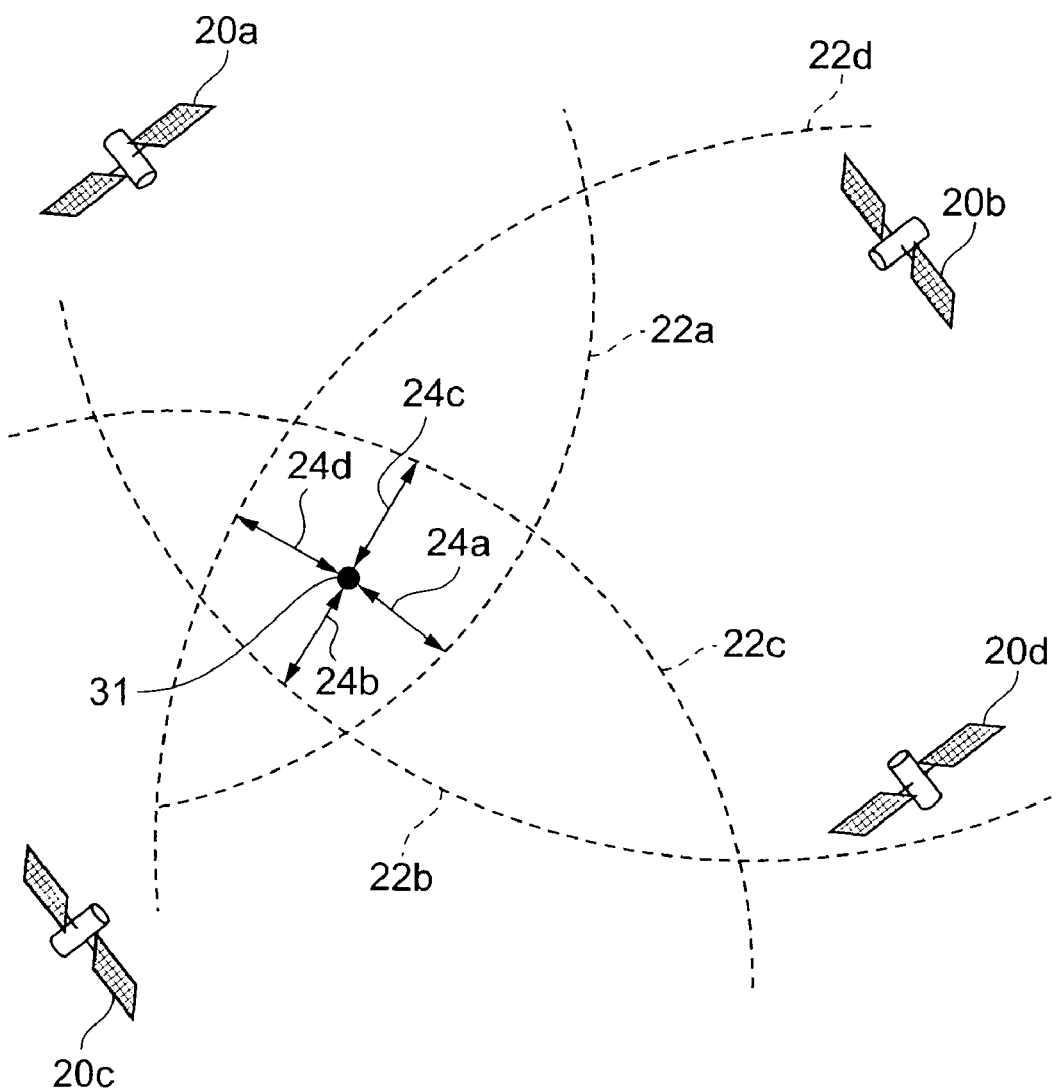
FIG. 6 shows the concept of the pseudo clock bias that is calculated by the distance difference calculation section.

The distance difference calculation section 14 constitutes distance difference calculation means for calculating, for each GPS satellite 20, the difference between the respective distances from the position of the receiver 10 calculated by the position calculation section 13 to the plurality of GPS satellites 20a to 20d and the respective distances calculated by the distance calculation section 12. More specifically, the distance difference calculation section 14 first calculates the respective distances $r'_n$ from the position of receiver 10 calculated by the position calculation section 13 to the plurality of GPS satellites 20a to 20d, from the information indicating the respective positions. Thereafter, suppose that the respective distances $r'_n$ thus calculated are subtracted from the respective distances (pseudo distance) $pr_n$ which were calculated by the distance calculation section 12 and the subtracted values are the difference (pseudo clock bias) $\Delta r_n = pr_n - r'_n$. As shown in FIG. 6, this represents the distances 24a to 24d from the spheres (circles) 22a to 22d at whose center are located the GPS satellites 20a to 20d and whose radii are the calculated distances $pr_n$ to the calculated position 31 of receiver 10.

Supposing that $r_n$ of Equation (1) above is $r'_n$, the abovementioned pseudo clock bias $\Delta r_n$ can be regarded according to the following equation:

$$\Delta r_n = clk + \epsilon'_n$$

Here, clk is the shift between the clocks of the GPS satellites 20a to 20d and the clock of the receiver 10. $\epsilon'_n$ is the error change component (a component that cannot be corrected) which corresponds with $r'_n$. Here, the pseudo distance becomes more exact as $\epsilon'_n$ approaches zero and, in this case, $\Delta r_n$ takes ordered values between the plurality of GPS satellites 20a to 20d. However, the pseudo distance $pr_n$ becomes less exact as $\epsilon'_n$ moves away from zero and, in this case, $\Delta r_n$ takes varied values between the plurality of GPS satellites 20a to 20d. That is, the error component of the pseudo distance can be evaluated according to the variation of $\Delta r_n$. The distance difference calculation section 14 outputs the calculated pseudo clock bias $\Delta r_n$ to the position accuracy evaluation section 15 and the signal source accuracy evaluation section 16.

The position accuracy evaluation section 15 constitutes position accuracy evaluation means for evaluating the accuracy of the position of the receiver 10 calculated by the position calculation section 13 on the basis of the variation, between the GPS satellites 20a to 20d, of the pseudo clock bias $\Delta r_n$ for each of the GPS satellites 20a to 20d calculated by the distance difference calculation section 14. More specifically, the position accuracy evaluation section 15 calculates the distribution $\sigma_{\Delta rn}^2$ of the pseudo clock bias $\Delta r_n$ and uses the calculated distribution $\sigma_{\Delta rn}^2$ in the evaluation as a value which represents the variation. For example, the position accuracy evaluation section 15 makes the evaluation that the accuracy of the position of the receiver 10 thus calculated is poor in cases where the calculated distribution $\sigma_{\Delta rn}^2$ is greater than a preset threshold value and makes the evaluation that the accuracy of the position of the receiver 10 is good in cases where the calculated distribution $\sigma_{\Delta rn}^2$ is smaller than the preset threshold value. In addition, the value of the calculated distribution $\sigma_{\Delta rn}^2$ itself may also be used as the value which represents the accuracy of the calculated position of the receiver 10 (a value indicating the extent of the divergence between the actual position of the receiver 10 and the calculated position). In this case, it is evident that the smaller the calculated value of the distribution $\sigma_{\Delta rn}^2$, the better the accuracy of the position of the receiver 10. In addition, the amount of divergence between the actual position of the receiver 10 and the calculated position may be estimated by multiplying the calculated distribution $\sigma_{\Delta rn}^2$ by a coefficient that is set as a result of tuning beforehand. The position accuracy evaluation section 15 pre-stores the above rule for evaluating the accuracy of the calculated position of the receiver 10 and performs an evaluation on the basis of this rule.

Information representing the evaluation of the calculated position of the receiver 10 performed by the position accuracy evaluation section 15 is suitably used by the receiver 10. For example, in cases where the accuracy is judged to be favorable or in cases where the value is a value representing accuracy at or above a fixed level, the positioning results (information representing the position of the receiver 10 calculated by the position calculation section 13) is output to the output section 17 (and is not output when the accuracy is poor). Furthermore, the information representing the evaluation performed by the position accuracy evaluation section 15 may also be output to the output section 17 together with the positioning results. In addition, in cases where the accuracy is judged to be poor or in cases where the value is value which represents accuracy at or above a fixed level, for example, control may also be exercised to perform the positioning once again.

The signal source accuracy evaluation section 16 constitutes signal source accuracy evaluation means for evaluating the accuracy of the respective GPS satellites 20a to 20d when the position of the receiver 10 is calculated by the position calculation section 13 on the basis of the variation, between the GPS satellites 20a to 20d, of the pseudo clock bias $\Delta r_n$ for each of the GPS satellites 20a to 20d calculated by the distance difference calculation section 14. The accuracy of the GPS satellites 20a to 20d represents to what extent the calculated distance with a small error change component $\epsilon'$ (pseudo distance) $pr_n$ can be calculated by the distance calculation section 12 by using the signals from the GPS satellites 20a to 20d.

Further, this evaluation is based on the fact that, in cases where the error change component $\epsilon'$ is small, there is little variation, between the GPS satellites 20a to 20d, of the pseudo clock bias $\Delta r_n$ but in cases where $\epsilon'$ is large, there is a large amount of variation, between the GPS satellites 20a to 20d, of the pseudo clock bias $\Delta r_n$. More specifically, the position accuracy evaluation section 15 performs clustering on the respective GPS satellites 20a to 20d on the basis of the pseudo clock bias $\Delta r_n$. As a result of the clustering, in comparison with the other GPS satellites 20a to 20d, the GPS satellites 20a to 20d having a greatly different pseudo clock bias $\Delta r_n$ can be extracted. For example, in cases where the extraction of the GPS satellites 20a to 20d based on the pseudo clock bias $\Delta r_n$ is performed in this way, the accuracy of the respective GPS satellites 20a to 20d thus extracted is evaluated as being low. The signal source accuracy evaluation section 16 pre-stores a rule for evaluating the accuracy of the respective GPS satellites 20a to 20d and performs an evaluation based on this rule.

Information representing the evaluation of the accuracy of the respective GPS satellites 20a to 20d by the signal source accuracy evaluation section 16 is suitably used by the receiver 10. For example, in cases where the number of GPS satellites 20a to 20d judged as having poor accuracy is equal to or less than a fixed number, the positioning result (information indicating the position of the receiver 10 thus calculated by the position calculation section 13) is output to the output section 17 (but is not output when the accuracy is poor). Furthermore, information representing the evaluation by the signal source accuracy evaluation section 16 may also be output to the output section 17 together with the positioning results. In addition, control to perform positioning may also be exercised once again without using the GPS satellites 20a to 20d judged as having poor accuracy, for example.

The output section 17 constitutes means for outputting information which is input by the position accuracy evaluation section 15 and signal source accuracy evaluation section 16 and so forth by means of a screen display or speech or the like. The information thus output includes information indicating the position of the receiver 10 calculated by the position calculation section 13, for example. The user of the receiver 10 is able to find out the position of the receiver 10, that is, their own position, for example, by referencing the information thus output.

Figure 7:
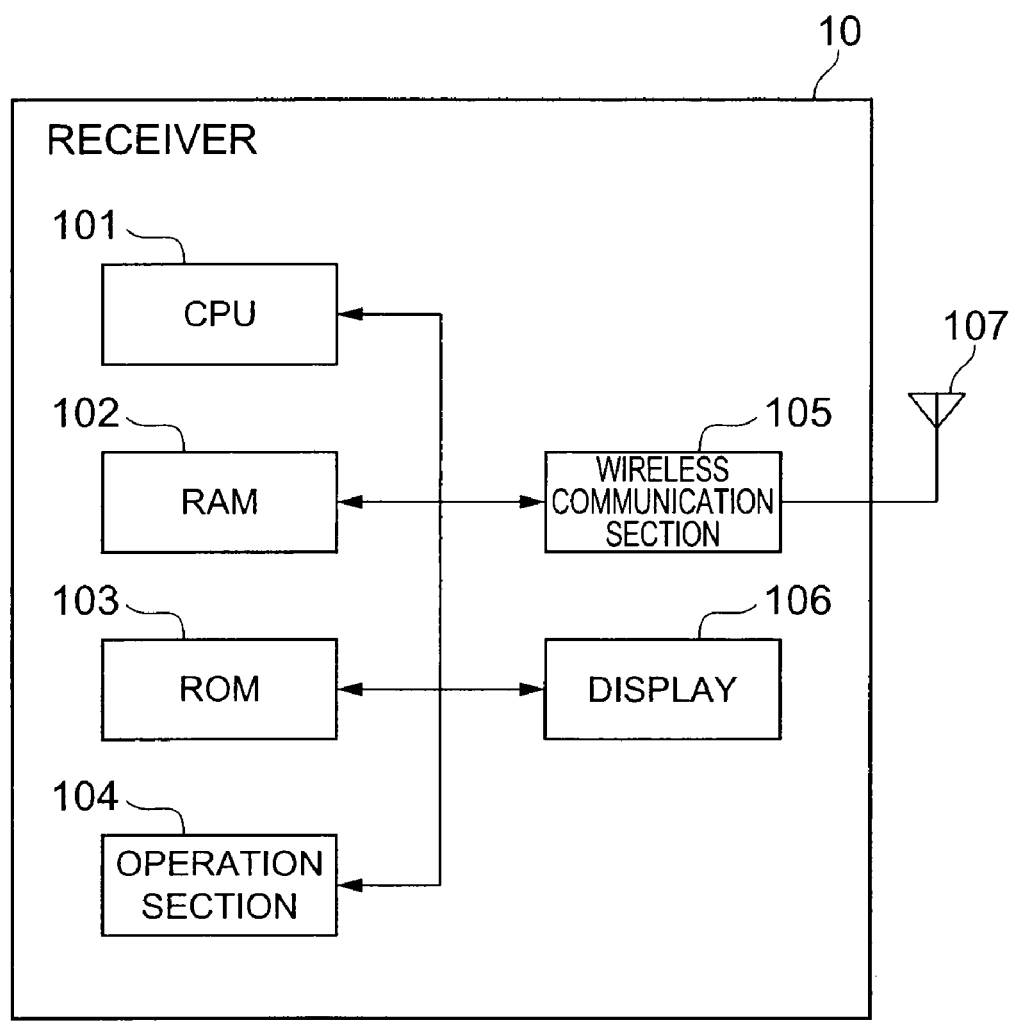
FIG. 7 shows the hardware constitution of the receiver according to the embodiment of the present invention.

Thereafter, the hardware constitution of the receiver 10 according to this embodiment is shown in FIG. 7. As shown in FIG. 7, the receiver 10 is constituted by hardware such as a CPU (Central Processing Unit) 101, a RAM (Random Access Memory) 102, a ROM (Read Only Memory) 103, an operation section 104, a wireless communication section 105, a display 106, and an antenna 107. The abovementioned functions are exhibited as a result of the operation of these constituent elements. In addition, the functions above may also be implemented by means of a positioning IC chip which the receiver 10 comprises and which possesses each of the functions of at least the distance calculation section 12, the position calculation section 13, the distance difference calculation section 14, the position accuracy evaluation section 15, and the signal source accuracy evaluation section 16.

Figure 8:
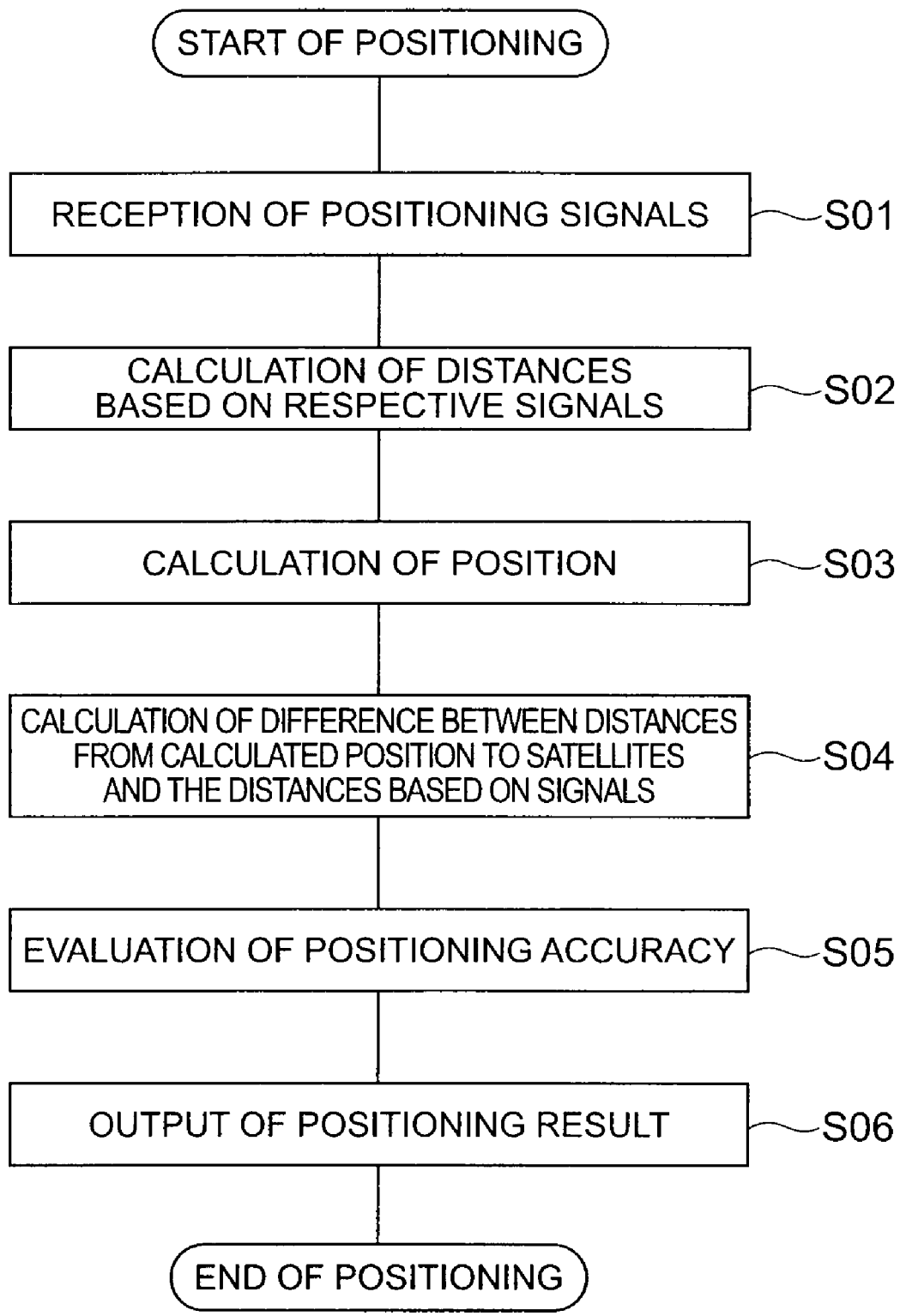
FIG. 8 is a flowchart showing the processing (positioning method) that is executed by the receiver according to the embodiment of the present invention.

The processing (positioning method) executed by the receiver 10 according to this embodiment will be described next by using the flowchart of FIG. 8. This processing is started as a result of a positioning request being input to the receiver 10 by a user operation, for example. The positioning processing may also be started as a result of another trigger.

First, in the receiver 10, the positioning signals which are transmitted by a plurality of GPS satellites 20a to 20d are received by the signal reception section 11 (S01). The received information is output by the signal reception section 11 to the distance calculation section 12 and position calculation section 13. Thereafter, the distances between the respective GPS satellites 20 and the receiver 10 are calculated on the basis of the signals from the respective GPS satellites 20a to 20d by the distance calculation section 12 (S02, distance information acquisition step). The information indicating the calculated distances is then output by the distance calculation section 12 to the position calculation section 13 and distance difference calculation section 14.

Thereafter, the position of the receiver 10 is calculated by the position calculation section 13 from the information indicating the positions of the plurality of GPS satellites 20 and from the information indicating the respective distances calculated by the distance calculation section 12 (S03, position calculation step). The information indicating the position of the receiver 10 thus calculated is output by the position calculation section 13 to the distance difference calculation section 14. Thereafter, the pseudo clock bias $\Delta r_n$ which is the difference between the respective distances from the position of the receiver 10 calculated by the position calculation section 13 to the plurality of GPS satellites 20a to 20d and the respective distances calculated by the distance calculation section 12 is calculated for each GPS satellite 20 by the distance difference calculation section 14 (S04, distance difference calculation step). The pseudo clock bias $\Delta r_n$ thus calculated is used in the evaluation of the positioning accuracy and is therefore output by the distance difference calculation section 14 to the position accuracy evaluation section 15 and signal source accuracy evaluation section 16.

Thereafter, an evaluation of the positioning accuracy is performed by the position accuracy evaluation section 15 and signal source accuracy evaluation section 16 (S05, position accuracy step, signal source accuracy evaluation step). In other words, the accuracy of the position of the receiver 10 calculated by the position calculation section 13 is evaluated by the position accuracy evaluation section 15 on the basis of the variation between the GPS satellites 20a to 20d of the pseudo clock bias $\Delta r_n$ for each of the GPS satellites 20a to 20d. In addition, the accuracy of the respective GPS satellites 20a to 20d when calculating the position of the receiver 10 by the position calculation section 13 is evaluated by the signal source accuracy evaluation section 16 on the basis of the variation between the GPS satellites 20a to 20d of the pseudo clock bias $\Delta r_n$ for each of the GPS satellites 20a to 20d. The information on the respective positioning accuracy is used in controlling the output of the positioning results, for example.

Thereafter, in the receiver 10, the positioning results (information indicating the position of the receiver 10 which is calculated by the position calculation section 13) are output by the position accuracy evaluation section 15 and so forth to the output section 17 and an output of the positioning results is performed by the output section 17 (S06). The user is able to find out the positioning results by referencing the output by the output section 17. However, the output of the positioning result need not necessarily be carried out. For example, as mentioned earlier, in cases where the evaluation of the positioning accuracy in S05 reveals low accuracy, positioning results need not be output. The evaluation results of the positioning accuracy may also be output together with the positioning result.

According to this embodiment, as mentioned earlier, the distance between the respective GPS satellites 20 and receiver 10 is calculated on the basis of the positioning signals which are transmitted by the plurality of GPS satellites 20 and received by the receiver 10. The position of the receiver 10 is then calculated on the basis of the distance thus calculated. Thereafter, the difference between the respective distances from the position of the receiver 10 thus calculated to the GPS satellites 20 and the distances between the respective GPS satellites 20 and the receiver 10 based on the positioning signals is calculated and the accuracy of the position of the receiver 10 calculated based on the variation ($\sigma_{\Delta r_n}^2$) of the difference is evaluated. Furthermore, the accuracy of the respective GPS satellites 20 when calculating the position of the receiver 10 is similarly evaluated.

Therefore, according to this embodiment, as long as the position of the receiver 10 can be calculated, the accuracy of the calculated position and the accuracy of the GPS satellites 20 can be evaluated. That is, according to this embodiment, the GPS satellites 20 required for the calculation of the position of the receiver 10 can be captured and the positioning accuracy can be evaluated by using fewer GPS satellites 20. More specifically, with RAIM, which is a conventional method of evaluating the positioning accuracy, although (the capture of) five or more GPS satellites 20 is required, the positioning accuracy of four or more GPS satellites 20 can be evaluated in this embodiment.

Moreover, in this embodiment, there is no need to repeat the positioning calculation using the combination of GPS satellites 20 as is the case with RAIM. In other words, with this embodiment, because the calculation of the position of the receiver 10 required in order to evaluate the accuracy may be performed once, the positioning accuracy can be evaluated easily with a small amount of calculation.

Although both the accuracy of the position and the accuracy of the GPS satellites 20 are evaluated for the positioning accuracy in this embodiment, only either one need be evaluated. In other words, only either one of the position accuracy evaluation section 15 and signal source accuracy evaluation section 16, which are constituent elements that perform an evaluation of the positioning accuracy provided in the receiver 10 need be provided.

Furthermore, although GPS satellites 20 are employed as the signal sources which transmit positioning signals in this embodiment, GPS satellites 20 need not necessarily be employed. Any component which is capable of transmitting positioning signals is acceptable. For example, base stations which are included in the mobile communication network may be the signal source. Furthermore, combined usage of GPS satellites and base stations is possible (hybrid positioning). In this case, rather than a minimum of four GPS satellites being required as mentioned earlier, only one GPS satellite may be used in the positioning.

In addition, although the subject of the positioning in this embodiment is the receiver 10 which is also the positioning target, the subject of the positioning and the target of the positioning need not necessarily coincide. For example, the subject of the positioning may be carried out by a positioning server with a constitution which is separate from the receiver 10. The positioning server can be connected to the receiver 10 via the mobile communication network, for example, and performs positioning upon receipt of information required for the positioning from the receiver 10. The positioning server may perform all positioning-related computation upon receipt of the required information from the receiver 10. Alternatively, the positioning server may acquire information indicating the calculated distances between the GPS satellites 20 and the receiver 10 as a result of the receipt of this information by the receiver 10 and perform positioning-related computation based on the information indicating these distances thus acquired.

A further embodiment according to the present invention will be described next. In the above GPS positioning, it is necessary to find out the positions of the GPS satellites 20 at the transmission times at which the GPS satellites 20 transmit the positioning signals. Normally, in GPS positioning, the positions of the GPS satellites 20 at optional times are calculated by means of orbit parameters in navigation messages which are transmitted by the GPS satellites 20. Therefore, in order to find out the exact position of the GPS satellites 20, exact transmission times are required. Normally, information indicating the transmission times (TOW: Time Of Week) is acquired from the received positioning signals (measurements). However, because the calculated positions of the GPS satellites 20 are displaced if the TOW information is erroneous for whatever reason, the accuracy of the GPS positioning deteriorates markedly.

Figure 9:
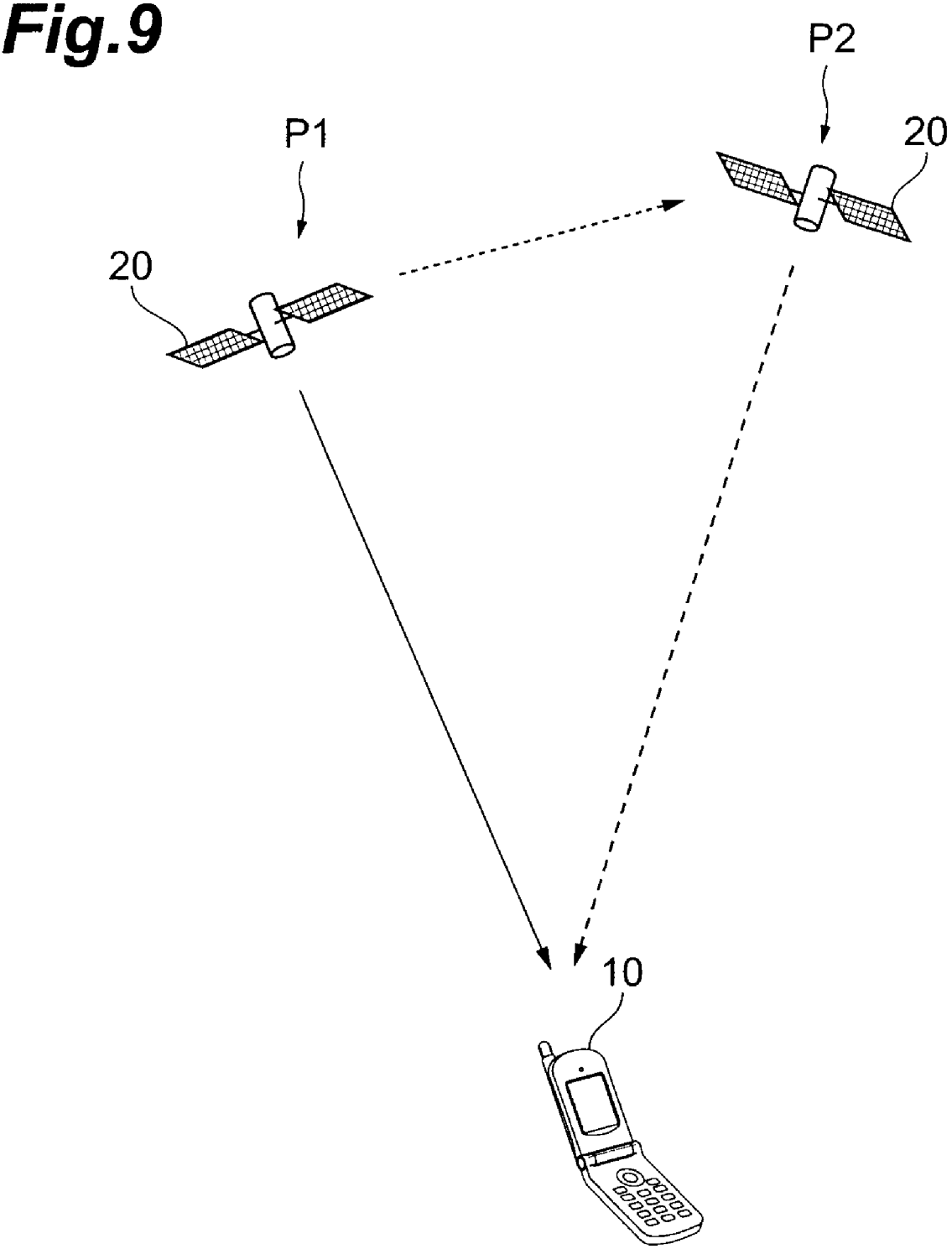
FIG. 9 shows the position of the GPS satellite as a function of time.

As shown in FIG. 9, the GPS satellites 20 move at a speed of a few km/s. When the TOW information is erroneous, the positioning calculation is carried out with the GPS satellites 20 located in position P2 which is different from position P1 irrespective of whether the GPS satellites 20 are actually located in position P1 during the transmission of the positioning signals. As a result, the calculated position of receiver 10 is erroneous. Therefore, the object of this embodiment is to perform exact positioning even in a case where the TOW information is erroneous. In this embodiment, only those points which differ from those of the embodiments described earlier will be described.

In this embodiment, the position calculation section 13 determines the search time range and the search time step width from the TOW information acquired from the received positioning signals (measurements). More specifically, for example, a range at whose center is the time indicated by the TOW information and which extends on the order of a few seconds to several tens of seconds (five seconds, for example) before and after the indicated time is taken as the search time range and a search time step which is on the order of a few ms to several hundred ms (100 ms, for example) is adopted. The extent of the range adopted as the search time range and the search time step are pre-stored in the position calculation section 13.

The position calculation section 13 uses the above-mentioned orbit parameters to calculate the positions of the respective GPS satellites 20a to 20d at a plurality of times which are separated by the search time step width in the search time range. The position calculation section 13 calculates the positions of the receiver 10 at each time from the information indicating the respective GPS satellites 20a to 20d calculated in accordance with the plurality of times and the respective distances calculated by the distance calculation section 12. The position calculation section 13 outputs information representing the positions of the receiver 10 calculated at each time to the distance difference calculation section 14. The processing by the position calculation section 13 is carried out in S03 in the flowchart of FIG. 8.

The distance difference calculation section 14 calculates the pseudo clock bias $\Delta r_n$ (TOW) at each time on the basis of the positions of the receiver 10 calculated at each time that has been input by the position calculation section 13. The distance difference calculation section 14 outputs the pseudo clock bias $\Delta r_n$ (TOW) calculated at each time to the position accuracy evaluation section 15. The processing by the distance difference calculation section 14 is carried out in S04 of the flowchart of FIG. 8.

Figure 10:
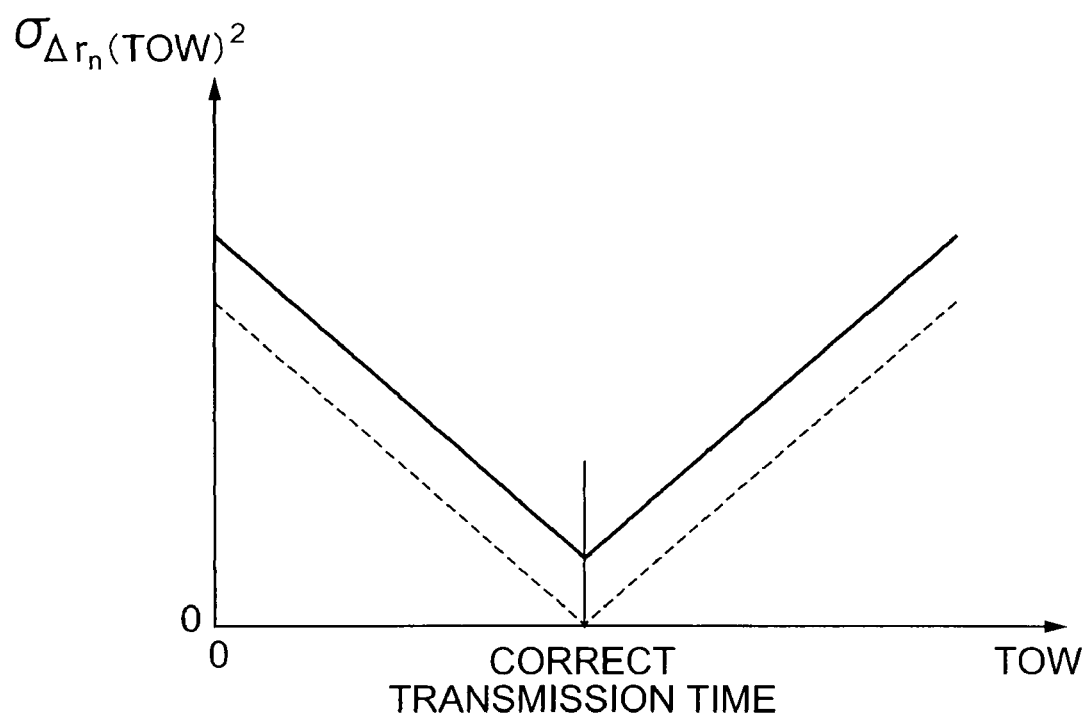
FIG. 10 is a graph showing the relationship between the TOW and the distribution of the pseudo clock bias.

The position accuracy evaluation section 15 calculates the distribution $\sigma_{\Delta rn(TOW)}^2$ of the pseudo clock bias $\Delta r_n$ (TOW) at each time and uses the calculated distribution $\sigma_{\Delta rn(TOW)}^2$ in the evaluation as a value which represents the variation. In other words, the position accuracy evaluation section 15 evaluates the accuracy of the positions of the receiver 10 calculated by the position calculation section 13 at each time. Here, the relationship between the TOW and the calculated distribution $\sigma_{\Delta rn(TOW)}^2$ is that shown in FIG. 10. In FIG. 10, the horizontal axis represents TOW and the vertical axis represents the distribution $\sigma_{\Delta rn(TOW)}^2$.

If the correct time is within the search range, the GPS satellites 20 must move away after approaching their positions at that time. The positioning error decreases as the correct time is approached and then increases as one moves away from the correct time. In other words, the positioning error becomes a minimum for the correct time. Therefore, the time curve of the distribution $\sigma_{\Delta rn(TOW)}^2$ of the pseudo clock bias $\Delta r_n$ (TOW) which represents the positioning error also be convex downward as shown in FIG. 10 and the distribution $\sigma_{\Delta rn(TOW)}^2$ of the pseudo clock bias $\Delta r_n$ (TOW) is a minimum at the correct time.

Hence, by the position accuracy evaluation section 15, the time, at which the distribution $\sigma_{\Delta rn(TOW)}^2$ of the pseudo clock bias $\Delta r_n$ (TOW) is minimum in the search time range, is taken as the correct time. Furthermore, the position accuracy evaluation section 15 takes the positioning results at that time as the final positioning results. In other words, the position accuracy evaluation section 15 estimates the most accurate position for the receiver 10 among the accuracies of the positions of the receiver 10 for each of the plurality of times as the position of the receiver 10. The processing by the position accuracy evaluation section 15 is performed in S05 of the flowchart of FIG. 8. In addition, the evaluation of the positioning accuracy by the position accuracy evaluation section 15 and the signal source accuracy evaluation section 16 of the earlier described embodiments is carried out for the final results (S05 in FIG. 8).

With the above constitution, even in cases where an error arises with the TOW which is used in the positioning calculation for whatever reason and, as a result, an error arises with the information which represents the positions of the GPS satellites 20a to 20d which corresponds with the TOW, the positions of the receiver 10 which corresponds with a plurality of times in the search time range is calculated and the accuracy is evaluated. As a result, exact positioning can be performed and exact transmission times can be detected (selected). In cases where the receiver 10 is outside, because there are relatively few errors with the respective distances (pseudo distances) $pr_n$ calculated by the distance calculation section 12, positioning of a relatively high accuracy is possible with the above constitution. Whether the search time range is set and a calculation of the positioning is carried out for each of the plurality of times is determined on the basis of settings made beforehand by the user, for example.

However, in cases where the receiver 10 is inside, there is the problem that the GPS satellites 20 are barely visible the receiver 10. In addition, the proportion of GPS satellites 20 with a low elevation among the GPS satellites 20 which can be utilized is large and a large number of multipaths are received. Hence, there is the problem that there is a relatively large number of errors with the respective distance (pseudo distances) $pr_n$ calculated by the distance calculation section 12. In addition to these problems, because the aforementioned transmission time errors arise, it is incredibly difficult to perform positioning calculations by setting the search time range as mentioned earlier for a single instance of receiving signals from the GPS satellites 20.

Therefore, assuming a case where the receiver 10 is indoors, the signal reception section 11 in the receiver 10 desirably receives a plurality of positioning signals for each of the GPS satellites 20 at different reception times. In other words, a plurality of individual positioning results for different reception times are desirably used. In this case, the position calculation section 13 calculates a plurality of distances between the GPS satellites 20 and the receiver 10 for each of the GPS satellites 20 as the distances used in the plurality of individual positioning results for different reception times in the same reception position.

Further, the position calculation section 13 calculates the position of the receiver 10 at each reception time from the information indicating the respective distances calculated on the basis of the signals received from the GPS satellites 20 at the different reception times. The calculation of the positions is carried out by setting the search time range and detecting (selecting) the transmission times (time matching) as mentioned earlier.

Here, the position accuracy evaluation section 15 judges the positioning accuracy on the basis of the variation of the positioning results pertaining to the position of the receiver 10 calculated for each reception time. More specifically, it is judged whether the variation of the differences ΔT between the transmission times TOW detected for each reception time and the reception times (more specifically, the distribution of the distribution $\sigma_{\Delta T}^2$) exceeds the range preset by the position accuracy evaluation section 15. If it is judged that the preset range is exceeded, it is judged that the positioning accuracy is poor and, if it is judged that the preset range is not exceeded, it is judged that the positioning accuracy is good. In other words, the position accuracy evaluation section 15 detects transmission times at which the signals are transmitted by the GPS satellites 20 and reception times at which the signals are received by the receiver 10 for a plurality of positions of the receiver calculated by performing time matching in accordance with the plurality of reception times by the position calculation section 13. The position accuracy evaluation section 15 evaluates the accuracy of the position of the receiver 10 on the basis of the variation of the difference between the detected transmission time and the reception time.

Alternatively, the positioning accuracy may also be judged based on the variation of the positions of the receiver 10 calculated at each reception time. For example, it is judged whether all of the positions of the receiver 10 calculated at each reception time are contained in the range preset by the position accuracy evaluation section 15. If it is judged that all of the positions of the receiver 10 are not contained in the preset range, it is judged that the positioning accuracy is poor and, if it is judged that all of the positions of the receiver 10 are contained in the preset range, it is judged that the positioning accuracy is favorable. In cases where signals of a plurality of reception times are employed, the position accuracy evaluation section 15 may use both the variation of the difference ΔT between the transmission times TOW and the reception times which are detected at each reception time and the variation of the calculated positions for the receiver 10 in the evaluation of the positioning accuracy, or may use either the variation of the difference ΔT or the variation of the calculated positions.

With the above constitution, a plurality of signals are received from the GPS satellites 20 which correspond with different reception times, positioning is carried out on the basis of the signals and the positioning accuracy is evaluated. As a result, even in cases where sufficient accuracy is not obtained with a single instance of receiving positioning signals such as when the receiver 10 is indoors or the like, exact positioning can be carried out as a result of receiving of a plurality of signals. It is determined, based on settings which are made beforehand by the user, for example, whether the positioning calculation is to be made on the basis of a plurality of signals which correspond with different reception times.

The positioning program which serves to allow a computer to execute a series of processes to perform positioning of the receiver 10 will be described next. As shown in FIG. 11, the positioning program 81 is stored in a program storage area 80a which is formed in a recording medium 80 which the computer comprises.

The positioning program 81 is constituted comprising a main module 81a which statistically controls the positioning processing, a signal reception module 81b, a distance calculation module 81c, a position calculation module 81d, a distance difference calculation module 81e, a position accuracy evaluation module 81f, a signal source accuracy evaluation module 81g, and an output module 81h. The functions that are implemented by executing signal reception module 81b, distance calculation module 81c, position calculation module 81d, distance difference calculation module 81e, position accuracy evaluation module 81f, signal source accuracy evaluation module 81g, and output module 81h are the same as the functions of the signal reception section 11 of the receiver 10, the distance calculation section 12, the position calculation section 13, the distance difference calculation section 14, the position accuracy evaluation section 15, the signal source accuracy evaluation section 16, and the output section 17.

Further, the constitution is such that some or all of the positioning programs 81 may be transmitted via a transmission medium such as a communication line or may be received and recorded (including installation) by another device.

What is claimed is:

1. A positioning system for estimating a position of a receiver, comprising:
   distance information acquisition means for acquiring information from signals transmitted by a plurality of signal sources and received by the receiver;
   distance calculation means for calculating first respective distances, between the plurality of signal sources and the receiver, which are calculated on the basis of the signals transmitted by the plurality of signal sources and received by the receiver;
   position calculation means for calculating a position of the receiver from information indicating positions of the plurality of signal sources acquired by the distance information acquisition means and the first respective distances calculated by the distance calculation means;
   distance difference calculation means for calculating second respective distances from the position of the receiver calculated by the position calculation means to the positions of the plurality of signal sources acquired, and for calculating, for each of the plurality of signal sources, differences between the second respective distances and the first respective distances calculated by the distance calculation means; and position accuracy evaluation means for evaluating an accuracy of the position of the receiver calculated by the position calculation means, on the basis of variance of the differences calculated by the distance difference calculation means for each of the plurality of signal sources.

2. The positioning system according to claim 1, wherein the positioning calculation means calculates, from the information representing the positions of the plurality of signal sources at a plurality of times and the first respective distances calculated by the distance calculation means, a position of the receiver at each of the times;

the distance difference calculation means calculates the differences at each of the times; and the position accuracy evaluation means evaluates the accuracy of the position of the receiver calculated by the position calculation means at each of the times.

3. The positioning system according to claim 2, wherein the distance information acquisition means acquires a plurality of information for each of the signal sources;

the position calculation means calculates a plurality of positions of the receiver in accordance with the plurality of information acquired by the distance information acquisition means;

the distance difference calculation means calculates a plurality of the differences, for each of the plurality of positions of the receiver, calculated by the position calculation means; and the position accuracy evaluation means evaluates the accuracy of the plurality of positions of the receiver, on the basis of variance of the plurality of differences.

4. The positioning system according to claim 3, wherein the position accuracy evaluation means detects transmission times at which signals are transmitted by the plurality of signal sources and reception times at which the signals are received by the receiver, on the basis of the accuracy for the plurality of positions of the receiver which are evaluated at each of the plurality of times for each of the plurality of information, and evaluates the accuracy of the positions of the receiver on the basis of variance of the differences between the transmission times and the reception times.

5. The positioning system according to any one of claims 1 to 4, wherein the distance information acquisition means acquires a plurality of information for each of the signal sources;

the position calculation means calculates a plurality of positions of the receiver in accordance with the plurality of information, the plurality of information being acquired by the distance information acquisition means;

the distance difference calculation means calculates a plurality of the differences, for each of the plurality of positions of the receiver, which are calculated by the position calculation means; and the position accuracy evaluation means evaluates positional accuracy of the receiver on the basis of variance of the plurality of positions of the receiver calculated by the position calculation means.

6. A positioning system for estimating a position of a receiver, comprising:

distance information acquisition means for acquiring information from signals transmitted by a plurality of signal sources and received by the receiver;

distance calculation means for calculating first respective distances, between the plurality of signal sources and the receiver, which are calculated on the basis of the signals transmitted by the plurality of signal sources and received by the receiver;

position calculation means for calculating a position of the receiver from information indicating positions of the plurality of signal sources acquired by the distance information acquisition means and the first respective distances calculated by the distance calculation means;

distance difference calculation means for calculating second respective distances from the position of the receiver calculated by the position calculation means to the positions of the plurality of signal sources acquired, and for calculating, for each of the plurality of signal sources, differences between the second respective distances and the first respective distances calculated by the distance calculation means; and signal source accuracy evaluation means for evaluating an accuracy of the signals transmitted by the plurality of signal sources when the position of the receiver is calculated by the position calculation means, on the basis of variance of the differences calculated by the distance difference calculation means for each of the plurality of signal sources.

7. A positioning IC chip for estimating a position of a receiver, comprising:

distance information acquisition means for acquiring information from signals transmitted by a plurality of signal sources and received by the receiver;

distance calculation means for calculating first respective distances, between the plurality of signal sources and the receiver, which are calculated on the basis of the signals transmitted by the plurality of signal sources and received by the receiver;

position calculation means for calculating a position of the receiver from information indicating positions of the plurality of signal sources acquired by the distance information acquisition means and the first respective distances calculated by the distance calculation means;

distance difference calculation means for calculating second respective distances from the position of the receiver calculated by the position calculation means to the positions of the plurality of signal sources acquired, and for calculating, for each of the plurality of signal sources, differences between the second respective distances and the first respective distances calculated by the distance calculation means; and position accuracy evaluation means for evaluating an accuracy of the position of the receiver calculated by the position calculation means, on the basis of variance of the differences calculated by the distance difference calculation means for each of the plurality of signal sources.

8. A positioning IC chip for estimating a position of a receiver, comprising:

distance information acquisition means for acquiring information from signals transmitted by a plurality of signal sources and received by the receiver;

distance calculation means for calculating first respective distances, between the plurality of signal sources and the receiver, which are calculated on the basis of the signals transmitted by the plurality of signal sources and received by the receiver;

position calculation means for calculating a position of the receiver from information indicating positions of the plurality of signal sources acquired by the distance information acquisition means and the first respective distances calculated by the distance calculation means;

distance difference calculation means for calculating second respective distances from the position of the receiver calculated by the position calculation means to the positions of the plurality of signal sources acquired, and for calculating, for each of the plurality of signal sources, differences between the second respective distances and the first respective distances calculated by the distance calculation means; and signal source accuracy evaluation means for evaluating an accuracy of the signals transmitted by the plurality of signal sources when the position of the receiver is calculated by the position calculation means, on the basis of variance of the differences calculated by the distance difference calculation means for each of the plurality of signal sources.

9. A positioning method for estimating a position of a receiver, the method comprising:

acquiring information from signals transmitted by a plurality of signal sources and received by the receiver;

calculating first respective distances, between the plurality of signal sources and the receiver, which are calculated on the basis of the signals transmitted by the plurality of signal sources and received by the receiver;

calculating a position of the receiver from information indicating positions of the plurality of signal sources acquired in the acquiring and the first respective distances;

calculating second respective distances from the position of the receiver calculated in the calculating the position to the positions of the plurality of signal sources acquired in the acquiring;

calculating, for each of the plurality of signal sources, differences between the second respective distances and the first respective distances calculated in the calculating the first respective distances; and evaluating an accuracy of the position of the receiver calculated in the calculating the position, on the basis of variance of the differences calculated in the calculating the distance differences for each of the plurality of signal sources.

10. A positioning method for estimating a position of a receiver, the method comprising:

acquiring information from signals transmitted by a plurality of signal sources and received by the receiver;

calculating first respective distances, between the plurality of signal sources and the receiver, which are calculated on the basis of the signals transmitted by the plurality of signal sources and received by the receiver;

calculating a position of the receiver from information indicating positions of the plurality of signal sources acquired in the acquiring and the first respective distances calculated;

calculating second respective distances from the position of the receiver calculated in the calculating the position to the positions of the plurality of signal sources acquired in the acquiring;

calculating, for each of the plurality of signal sources, differences between the second respective distances and the first respective distances calculated in the calculating the first respective distances; and evaluating an accuracy of the signals transmitted by the plurality of signal sources when the position of the receiver is calculated in the calculating the position, on the basis of variance of the differences calculated in the calculating the distance differences for each of the plurality of signal sources.

11. A non-transitory computer readable storage medium storing a positioning program that allows a computer to estimate a position of a receiver, the program, when executed, causing the computer to execute functions comprising:

a distance information acquisition function for acquiring information from signals transmitted by a plurality of signal sources and received by the receiver;

a distance calculation function for calculating first respective distances, between the plurality of signal sources and the receiver, which are calculated on the basis of the signals transmitted by the plurality of signal sources and received by the receiver;

a position calculation function for calculating a position of the receiver from information indicating positions of the plurality of signal sources acquired by the distance information acquisition function and the first respective distances;

a distance difference calculation function for calculating second respective distances from the position of the receiver calculated by the position calculation function to the positions of the plurality of signal sources acquired by the distance information acquisition function, and for calculating, for each of the plurality of signal sources, differences between the second respective distances and the first respective distances calculated by the distance calculation function; and a position accuracy evaluation function for evaluating an accuracy of the position of the receiver calculated by the position calculation function, on the basis of variance of the differences calculated by the distance difference calculation function for each of the plurality of signal sources.

12. A non-transitory computer readable storage medium storing a positioning program that allows a computer to estimate a position of a receiver, the program, when executed, causing the computer to execute functions comprising:

a distance information acquisition function for acquiring information from signals transmitted by a plurality of signal sources and received by the receiver;

a distance calculation function for calculating first respective distances, between the plurality of signal sources and the receiver, which are calculated on the basis of the signals transmitted by the plurality of signal sources and received by the receiver;

a position calculation function for calculating a position of the receiver from information indicating positions of the plurality of signal sources acquired by the distance information acquisition function and the first respective distances;

a distance difference calculation function for calculating second respective distances from the position of the receiver calculated by the position calculation function to the positions of the plurality of signal sources acquired by the distance information acquisition function, and for calculating, for each of the plurality of signal sources, differences between the second respective distances and the first respective distances calculated by the distance calculation function; and a signal source accuracy evaluation function for evaluating an accuracy of the signals transmitted by the plurality of signal sources when the position of the receiver is calculated by the position calculation function, on the basis of variance of the differences calculated by the distance difference calculation function for each of the plurality of signal sources.

13. The positioning system according to claim 1, wherein the positioning calculation means determines, based on the information acquired from each signal transmitted by the plurality of signal sources indicating a transmission time, a search time range at whose center is the transmission time and a search time step that separates the search time range into a plurality of times, and the positioning calculation means calculates, from the information representing the positions of the plurality of signal sources at the plurality of times and the first respective distances calculated by the distance calculation means, a position of the receiver at each of the times;

the distance difference calculation means calculates the differences at each of the times; and the position accuracy evaluation means evaluates the accuracy of the position of the receiver calculated by the position calculation means at each of the times.

\* \* \* \* \*